July 21, 1936.                    M. L. KUDER                    2,048,554
                              COLORIMETER APPARATUS
                              Filed Aug. 21, 1934                3 Sheets-Sheet 1
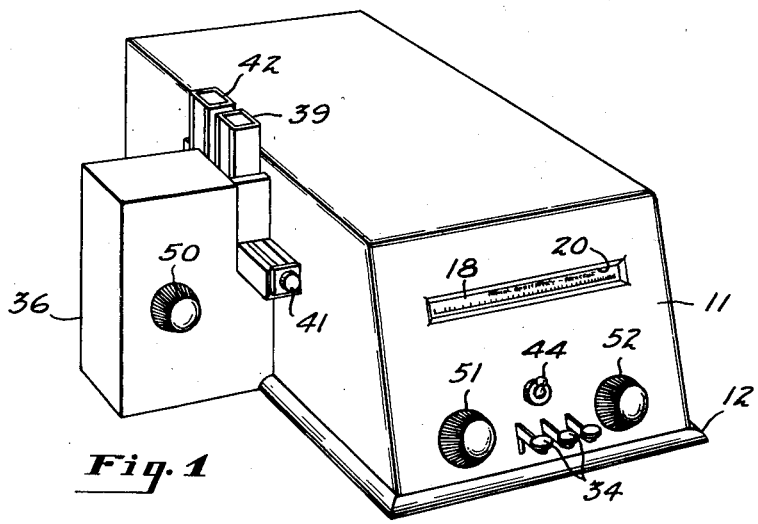
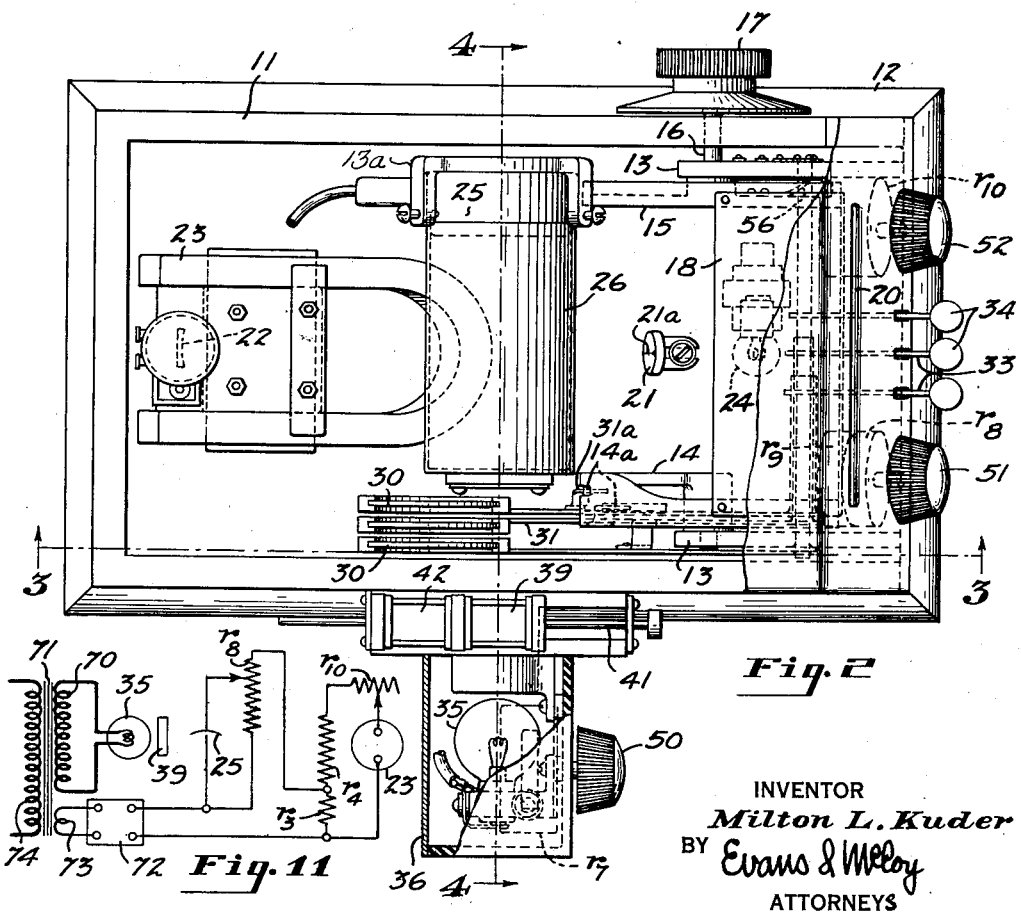
INVENTOR
*Milton L. Kuder*
BY *Evans & McCoy*
ATTORNEYS July 21, 1936.  M. L. KUDER  2,048,554
COLORIMETER APPARATUS
Filed Aug. 21, 1934  3 Sheets—Sheet 2

INVENTOR
Milton L. Kuder
BY Evans & McCoy
ATTORNEYS

July 21, 1936.   M. L. KUDER   2,048,554
COLORIMETER APPARATUS
Filed Aug. 21, 1934   3 Sheets—Sheet 3

INVENTOR
*Milton L. Kuder*
BY *Evans & McCoy*
ATTORNEYS

Patented July 21, 1936

2,048,554

UNITED STATES PATENT OFFICE 2,048,554

COLORIMETER APPARATUS

Milton L. Kuder, Erie, Pa.

Application August 21, 1934, Serial No. 740,805

9 Claims. (Cl. 88—14)

This invention relates to colorimeter apparatus and more particularly to colorimeter apparatus of a type suitable for use in clinical laboratories.

The principal object of the present invention is to provide a photo-electric colorimeter of such new and improved construction that colorimetric tests can be easily and quickly performed with a greater degree of accuracy than has been possible heretofore.

Another object is to provide a photo-electric colorimeter in which calibration of the instrument is independent of changes in sensitivity of the galvanometer and substantially independent of changes in the photo-electric cell characteristics where the changes in such characteristics are relative over the entire spectral range employed and independent of dust collection on the lenses, photo-electric cell and excitor lamp.

Another object is to provide a photo-electric colorimeter of such construction that in the operation of the same to determine the characteristics of an unknown solution, it is not necessary to make up and employ a standard solution and the errors arising from the preparation thereof for comparison purposes, and in which color matching by eye is eliminated.

Another object is to provide an improved photo-electric colorimeter in which readings of a diverse quantity of unknowns can be made more rapidly than in colorimeters heretofore employed.

A further object is to provide an improved photo-electric colorimeter which is calibrated initially against measured amounts of the specific unknowns to be measured.

An additional object of the invention is to provide means for compensating for the fatigue characteristics of a photo-electric cell of the character employed.

With the above and other objects in view, the present invention consists of certain features of construction and combinations of parts to be hereinafter described with respect to the accompanying drawings and then claimed.

In the drawings, which illustrate a suitable embodiment of the invention;

Figure 1 is a perspective view of the colorimeter;

Fig. 2 is a plan view of the apparatus, a portion of the housing thereof being broken away;

Fig. 11 is a diagrammatic illustration of a modified control circuit for use with alternating current source of energy.

Figure 3:
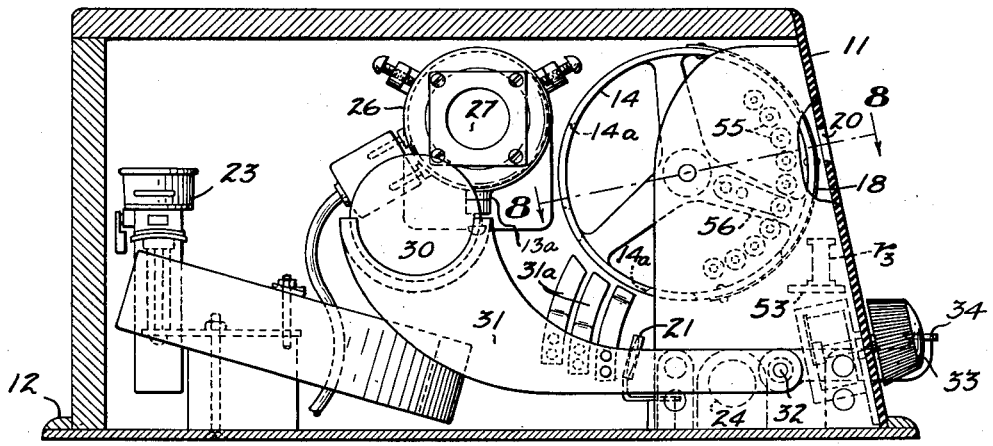
Fig. 3 is a longitudinal vertical section of the apparatus taken approximately on the line 3—3 of Fig. 2.
Figure 4:
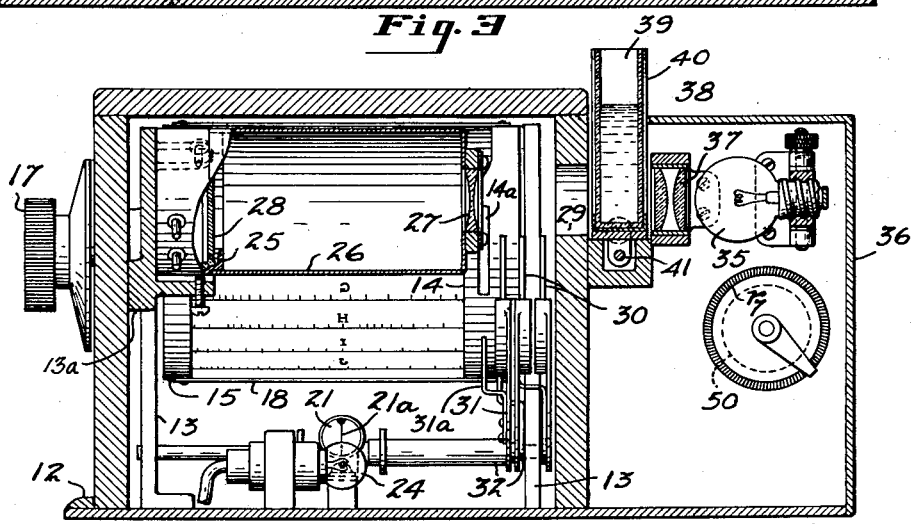
Fig. 4 is a transverse section taken approximately on the line 4—4 of Fig. 2.
Figure 5:
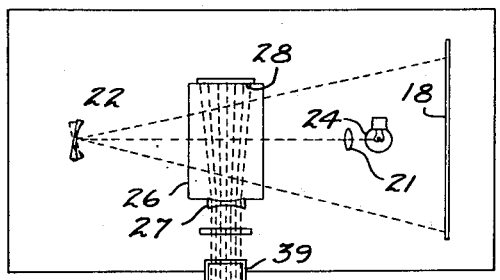
Fig. 5 is a diagrammatic plan view showing the passage of light rays to the photo-electric cell and the passage of light rays to the reading scale.
Figure 6:
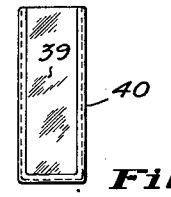
Fig. 6 is a side elevation of the container which carries the unknown solution and the support therefor.
Figure 7:
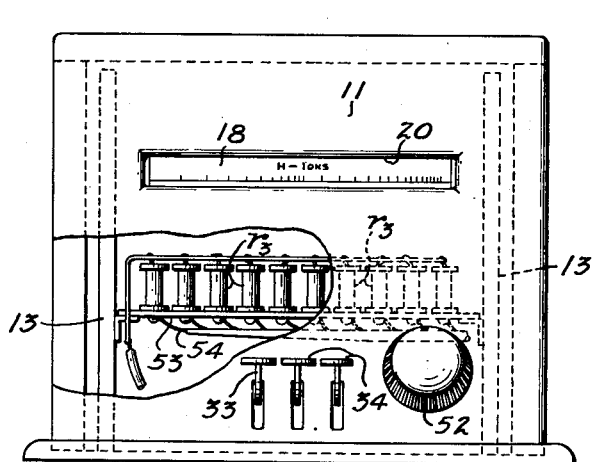
Fig. 7 is a front elevation of the apparatus, a portion of the same being broken away.
Figure 8:
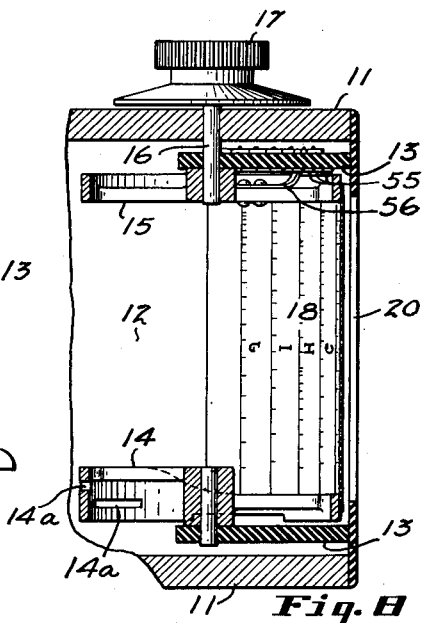
Fig. 8 is a fragmentary section taken approximately on the line 8—8 of Fig. 3, showing the drum which carries the calibrated scale.

The colorimeter of the present invention is primarily adapted for use in clinical laboratories in estimating quantities or percentages of unknown materials. Illustrative of different uses of the colorimeter apparatus are determinations of haemoglobin, ura-nitrogen, creatinine, and non-protein nitrogen quantities, phenolsulphonphthalein concentration for renal efficiency tests, phenoltetrachlorophthalein concentration for liver function tests, and hydrogen ion concentration. These are merely suggestive, however, of a few uses of the apparatus, and it is to be understood that the calibrations of the apparatus are by no means limited to these particular examples.

Briefly stated, the invention contemplates an instrument of a new and improved construction wherein the projection of light through the test specimen to a suitable photo-electric cell connected in circuit with an electrical indicating device causes the indicating device to display an indicator image on a suitable scale calibrated with respect to a series of different concentrations of standard solutions.

Referring to the accompanying drawings, in which like numerals refer to like parts throughout the several views, the various parts of the apparatus are confined within a suitable casing 11 supported on a base 12. Mounted at one end of the base 12 are a pair of drum supports 13 which rotatably support spaced circular drum heads 14 and 15, the supporting shaft 16 of the drum head 15 being extended through the casing 11 and provided with an operating knob 17. These drum heads carry an arcuate blank 18 of a suitable material upon which the various calibrated scales, to be later described, so that the individual scales are arranged parallel with the axis of the drum.

I have found that a translucent photographic film or a photographic film having its rear surface frosted by abrasion is very adaptable since the figures, lettering and divisions of the various scales may easily be printed on the film from a master negative prepared from an accurately prepared chart of the desired scales. However, the blank may be of any other suitable material. The blank 18 is provided with side margins 19 so that the blank can be clamped to the spaced drum heads 14 and 15. The forward end of the casing 11 is provided with a scale reading slot 20, the drum and attached scale 18 being rotatable by the knob 17 to bring the desired calibrated scale of the blank into registration with the scale reading slot 20. It will be noted that the scale blank 18 is disposed relatively close to the slot 20.

The percentage or quantity of concentration of the unknown test specimen is preferably directly indicated on the scale corresponding to the particular test being conducted. The instrument employs a straight line indicator which preferably is the image of a vertical wire 21a having an enlarged top and supported on the base 12 below the scale carrying drum and immediately behind a condensing lens 21. The wire image is reflected as a hair line focused on the calibrated scale by a vertical axis mirror 22 which is preferably concave, and which is actuated by a galvanometer 23. The galvanometer 23 preferably is of the taut suspension type having a low resistance coil. A suitable lamp 24 provides a beam of light that is transmitted to the gavanometer mirror and reflected from the galvanometer mirror to the reading scale so that the hair line indicating image appears on the scale as a black line with the enlarged base below the base line of the scale in a lighted field. The galvanometer 23 is suitably mounted on the base 12 at the end opposite the scale reading slot 20.

The galvanometer is influenced during the performance of a test by the differential in potential between a voltage source in the indicating circuit and the potential imposed on the indicating circuit by a photo-electric cell 25 preferably supported on the supports 13a above the path of the light reflected from the galvanometer mirror. The photo-electric cell is provided preferably with a cylindrical housing 26 which extends across the interior of the casing 11 above the light path from the galvanometer mirror. The housing 26 for the photo-electric cell has a lens 27 at its open end that spreads the incoming light rays uniformly over substantially the entire active area 28 of the photo-electric cell 25, the light rays from the light source being admitted into the casing 11 through an opening 29 in the side wall of the casing. The photo-electric cell used in the instrument is of the character that develops potential when subjected to light rays without external electrical excitation.

The photo-electric cell 25 is energized by light from an excitor lamp 35 of constant illumination. In order to insure that the light output is of a constant relative proportion throughout the entire spectral range, and that the total light intensity of the lamp 35 is maintained substantially constant, a voltmeter "V" is provided so that the voltage impressed on the lamp may be maintained at a predetermined value.

In order to prevent heat from the excitor lamp 35 causing any undue rise in temperature of the photo-electric cell 25, the light source, which is preferably of the concentrated filament type, is mounted externally of the casing 11 in a heat dissipating sub-casing 36. A pair of condensing lenses 37 is mounted at the light outlet opening of the sub-casing and in front of the excitor lamp 35 to direct parallel rays of light through the test specimen to the lens 27.

The test specimen to be analyzed is preferably contained in a rectangular glass container 39 which is carried in a frame 40 and fits into a suitable sliding holder 41. The slide 41 is slidably supported in a suitable manner so that the specimen container can be moved into the light path of the excitor lamp 35. Another glass fluid container 42 is also disposed on the slide 41 which may contain pure water, as will later be described. The optical surfaces of the containers 39 and 42 through which the light rays of the excitor lamp 35 pass are optical flats in order to avoid errors in calibration due to refraction.

The instrument is so arranged that any one of a number of desired dry color filters 30 may be used in calibrating the instrument with dry color standards from time to time. Standard solutions may also be used for this purpose where the reagents used change with age and thereby give different color density characteristics relative to the initial standards prepared therefrom because of such aging, or where the color concentration varies with the control in preparation of the standard and test specimen. These color filters 30 are carried at the ends of a corresponding number of arms 31 which are secured to concentric shafts 32 pivotally supported on the base 12. Each shaft is operated by a lever 33 projecting through the front end of the casing and having a suitable operating key 34 thereon. By pressing the proper key 34 the desired color filter may be moved into the path of incoming light rays and the calibration adjusted, as hereinafter set forth in detail. Each of the arms 31 carry a dry color standard and each arm is interlocked with the reading scale corresponding to the particular filter by an interlocking arm 31a that is permitted to enter a suitable slot or groove 14a formed in the drum head 14. Unless the drum is rotated to position with the proper reading scale before the window 20, the arm 31a prevents movement of the dry color standard into place for calibration check use. The arms 31a are relatively offset so that each has a corresponding window 14a in the drum head and operation of the arm 31 is prevented unless the corresponding window 14a is in registered relation with the arm 31a when the operating key 34 is depressed.

The battery switch 44 is mounted on the front panel of the casing. The variable resistor $r_7$ is carried by the subcasing 36 and operated by a suitable knob 50. The variable resistors $r_8$ and $r_9$ are carried on the front panel of the casing 11 and are operated from the contact control shaft 48 by the single knob 51, the contact members for both resistors being insulated from each other and mounted on the same shaft 48. The knob 51 becomes the control for a suitable slip connection 47 in the event that semi-automatic motor control 45 is employed (shown only in diagrammatic form in Fig. 10 and later described). The resistor $r_{10}$ is also carried on the front panel of the casing 11 and is operated by the knob 52. The individual resistors $r_3$ are mounted on a suitable bar 53 supported by the drum supports 13, and a suitable lead 54 is carried from each resistor $r_3$ to a corresponding contact member 55 that is mounted on the drum supports 13. These drum supports 13 are preferably made from insulating material, such as bakelite, and the contact members are carried through the support in order to provide electrical contact engagement with a brush 56 that is carried by and rotates with the scale supporting drum head 15. Since the contact brush 56 is grounded to the frame of the instrument it provides means for successively connecting each of the resistors $r_3$ into the indicating circuit in accordance with the position of the drum, whereby the particular resistor $r_3$ that corresponds with a particular indicator scale of the instrument is brought into the circuit simultaneously with the presenting of the indicator scale in the window 20 of the device.

Figure 9:
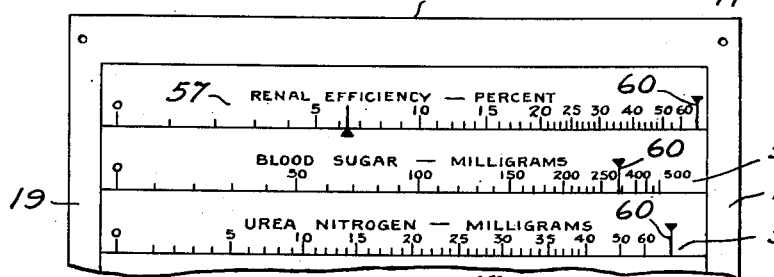
Fig. 9 is a plan view of the drum portion which carries a number of calibrated scales for different unknown solutions.

In Fig. 9 I have shown examples of calibrated scales. The numeral 57 represents a scale employed in conducting a renal efficiency test and may be calibrated to indicate percentages of output of the dye used. Numerals 58 and 59 represent scales used in determining blood-sugar and urea nitrogen quantities, respectively, and may be calibrated in milligrams. The markings 60 correspond to the galvanometer deflection reading for the dry color standard, or other standard, and facilitate checking the calibration of the instrument.

The relationships of the various elements of the colorimeter are described in connection with the control circuit for the instrument parts heretofore described. The control circuit and general operative relationship of the elements are diagrammatically illustrated in Fig. 10 of the drawings.

Figure 10:
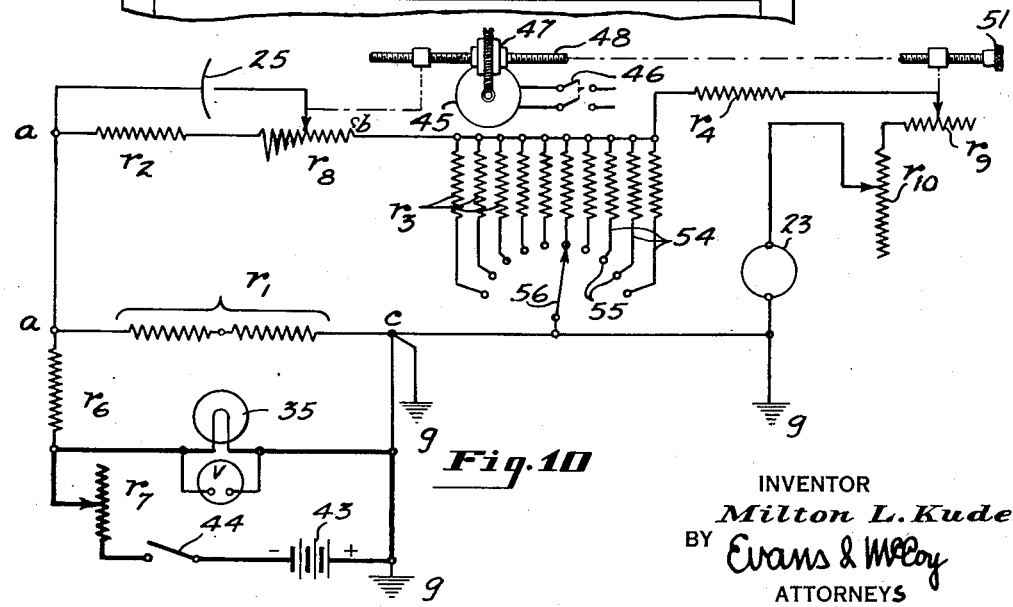
Fig. 10 is a diagrammatic wiring diagram of the control circuit.

A conventional six-volt storage battery 43 is preferably used to energize the system shown in Fig. 10. A switch 44 serves to open and close the battery circuit and an adjusting rheostat $r_7$, preferably of about .05 ohms, provides means for adjusting the voltage applied to the terminals of the excitor lamp 35 to a predetermined value, generally about five to five and one-half volts, as measured by the volt-meter V. In the control circuit here employed, the potential drop across a resistor $r_1$ of about .05 ohms is used to oppose the potential produced in the indicating circuit by the photo-electric cell 25, so that the movement of the galvanometer corresponds to the difference of these potentials.

In order to reduce the potential imposed upon the indicating circuit $a$, $b$, $c$ of the instrument, a resistor $r_6$ of about 100 ohms has been found satisfactory. Connected in circuit with the excitor lamp 35 and the resistance $r_6$ is the resistance $r_1$ of about .05 ohms in order that the voltage drop across the resistance $r_1$ may be used to oppose the voltage developed by the photo-electric cell 25 under excitation from the excitor lamp 35. This provides an energizing network that is interconnected with the main indicating circuit of the galvanometer in such manner that the voltage drop across the resistance $r_1$ will be constant and in direct proportion to the voltage applied to the excitor lamp 35 and in opposed relation with respect to the voltage developed by the photo-electric cell 25.

A fixed resistance $r_2$ of about 12 ohms, depending upon the characteristics of the photo cell, and an adjustable resistance $r_8$ of about 3 ohms, permanently connected in series with the main indicating circuit, provide an adjustable resistance shunt across the photo-electric cell. The terminal of the photo-electric cell that is connected to the resistor $r_8$ is adjustable with respect to the resistor $r_8$ in order that the photo-electric cell external shunt resistance value supplied by the resistors $r_2$ and a portion of $r_8$ may be adjusted in accordance with the fatigue characteristics of the cell used to maintain a predetermined indicating circuit voltage output of the cell 25 for a given illumination. This is believed to be a novel method of compensating for the fatigue characteristics of the photo-electric cell.

As the internal resistance of the photo cell changes with use, the resistance $r_8$ may be adjusted to maintain a constant voltage output from the cell for any given illumination from the excitor lamp. When the photo cell's internal shunt resistance decreases with use, the external photo cell shunt resistance, as controlled by the adjustable connection of the resistor $r_8$ to the photo cell may be increased so that the effective E. M. F. produced by the cell at the terminals "$a$" and "$b$" remains substantially constant.

The resistor $r_8$ is preferably so wound that the resistance value between adjacent contact points of the end of the resistor connected to resistor $r_2$ gradually decreases in value toward the end "$b$" of the resistor, the proportionate decrease being determined by the particular fatigue characteristics of the photo-electric cell 25 that is used and the adjustment being made manually or semi-automatically.

The adjustable contact member for resistor $r_8$ may be controlled, if desired, by a suitable synchronous motor 45 of the electric clock type, that is started into operation from any suitable source of alternating current by the closing of a switch 46 that is closed simultaneously with the closing of battery switch 44 in order that the progressive change in the effective external photo cell shunt resistance may be in a direct time/resistance functional relation with respect to the fatigue characteristic of the photo-electric cell used in the system.

Because of variations in fatigue characteristics of the cell 25 produced by different demands on the cell over an interval of time, it is found that manual adjustment of the starting position of the contact member for resistor $r_8$ is desired, and for this purpose a suitable manually operated slip connection 47 of any suitable type is interposed between the motor 45 and the contact operating shaft 48 that controls the adjustable contact member for resistors $r_8$ and $r_9$. The use of such semi-automatic adjusting mechanism is optional, however, and not essential to the basic circuit control. This equipment is shown only in diagrammatic form in Fig. 10. The remaining drawings do not show this automatic time/resistance control because it is an optional refinement.

The terminal "$b$" of the resistor $r_8$ is connected in series circuit relation with: a fixed galvanometer critical damping resistor $r_4$ of about seventy ohms; an adjustable galvanometer scale calibration adjustment resistor $r_{10}$ of about ten ohms; an optional indicating circuit control resistor $r_9$ of about three ohms that is also semi-automatically adjustable to compensate for minor changes in the effective resistance between points "$a$" and "$b$" of the photo-electric cell network and is operated by the motor shaft 48 and manually reset by the slip connection 47; the galvanometer 23; and the terminal "$c$" of the resistor $r_1$ that is energized from the battery network. Within this latter network the potential drop across the resistance $r_1$ opposes the potential drop across the resistors $r_2$ and the portion of resistor $r_8$ that is connected in shunt relation with the photo-electric cell 25, in order that the electro-motive force applied to the galvanometer terminals may be proportional to the difference between the potential drop across resistor $r_1$ and the effective output voltage of the photo-electric cell.

In order to maintain a constant resistance for the main indicator circuit, the contact for the resistor $r_9$ is operated in such a manner as to add resistance to the main indicator circuit in proportion to any decrease of resultant resistance between the points "a" and "b" produced by actuation of the contact for the resistor $r_8$ and is automatically driven by the shaft of the motor 45. This adjustment only has minor effect on the galvanometer indications and its use is optional. The slip connection between the motor and its shaft also permits manual adjustment of resistor $r_9$ corresponding to the manual adjustment of the contact member for resistor $r_8$.

Galvanometer scale calibration resistor $r_{10}$ is manually adjustable to compensate for variations in color produced by non-uniform reagents or due to variations in chemical technique, and also to adjust the instrument to either the dry standard or any other suitable liquid standard. Resistor $r_{10}$ thus becomes a manual calibration control means.

In order to adapt the control circuit to readings of different unknowns, it is desirable to provide shunt resistors $r_3$, of values ranging from 5 to 15 ohms, between the points "b" and "c" that are of such value as to permit a maximum scale deflection for the maximum concentration of each particular unknown. The switch 49 enables the operator to selectively connect the resistors $r_3$ between the points "b" and "c" of the system. It is understood, however, that the control circuit may also be used for the determination of certain unknowns by omitting the shunt resistors $r_3$ altogether or by substituting a fixed resistor $r_3$ of proper value in the galvanometer indicator circuit between points "b" and "c" to obtain the scale deflection desired. The resistors in $r_3$ also are essential in providing means for critically damping the movement of the galvanometer 23, together with $r_4$, $r_9$, and $r_{10}$.

The colorimeter as previously described and employing the control system as shown in Fig. 10, but without using the automatic motor control unit 45, the control of resistors $r_8$ and $r_9$ being manually obtained by operating the knob 51 which simultaneously controls both resistors $r_8$ and $r_9$, is operated as follows:

The colorimeter drum is first rotated by the operating knob 17 to bring the desired chemical scale into registration with the reading slot 20 of the instrument. The water cell 42 is then interposed in the light path between the excitor lamp 35 and the photo-electric cell. The battery switch 44 is then closed to energize the excitor lamp 35 and the intensity of the excitor lamp is adjusted to a predetermined standard intensity by moving the contact member for the resistor $r_7$ to such position that the voltmeter V reads the desired predetermined voltage corresponding with the intended intensity of the excitor lamp 35. With the water cell in place and the excitor lamp energized to the predetermined voltage, the fatigue control resistor $r_8$ for the photo-electric cell 25 is adjusted to bring the galvanometer image to the zero position of the selected scale.

With the water cell 42 in the light path, the dry color standard 30, corresponding to the particular chemical scale in use, may then be moved into the light path by depressing the proper operating key 34. The arm 31 that carries the dry color standard is interlocked with the scale carrying drum by the interfitting arms 31a and the apertures 14a in the manner described in order that only the proper dry color standard can be interposed in the light path for any particular scale calibration.

The instrument scale has a calibration marker 60 that is positioned on the scale to indicate the proper deflection for the galvanometer for this particular dry color standard and, by adjustment of the calibration resistor $r_{10}$, the galvanometer indicator image is brought into registration with the calibration marker 60 and the instrument is then ready to be used in measuring the unknown. The dry standard is then removed from the light path of the excitor lamp and the zero position of the galvanometer image on the scale is checked. If the dry color standard is held in the excitor lamp light path too long, it may be necessary to make a slight readjustment of the fatigue control resistor $r_8$ before proceeding with the next step. The water cell is then removed from the light path of the excitor lamp and the fluid cell containing the unknown specimen under test is placed into the light path as quickly as this operation can be performed by means of the slide 41. The scale indication of the galvanometer will then read the concentration of this unknown in accordance with the calibration of the scale. It is important to take the reading of the unknown immediately after the positioning of the unknown in the light path, because of the effect of light on certain of the materials tested by an instrument of this character and also because of the fatigue characteristics of the photo-electric cell.

After calibration of the galvanometer is effected by adjustment of the resistor $r_{10}$, this adjustment by the use of the dry color standard or any other fixed standard is unnecessary, except at comparatively long intervals of time. It is important, however, that the fatigue control resistor $r_8$ be adjusted to its position for zero reading of the galvanometer immediately prior to each succeeding test that is made on the instrument.

The use of the semi-automatic control mechanism 45 permits the reading of a series of unknowns in rapid succession without re-calibrating the instrument for its zero setting after each reading. Even with the use of this automatic adjusting mechanism for the contacting member of resistors $r_8$ and $r_9$, it is desirable to calibrate the instrument for its zero position by movement of the slip connection between the motor and contacts for resistors $r_8$ and $r_9$ about every five minutes by operation of the knob 51.

For accurate observations, it is essential to observe the zero position of the indicator with the water cell in the light path between each successive reading of an unknown, even when the semi-automatic control 45 is used, and when any noticeable deviation from the zero position is observed it is essential that the indicator be brought back to its zero position by movement of the manual adjustment knob 51 for resistors $r_8$ and $r_9$. This is permitted by the slip connection between the resistor contact members that are rigidly carried by the operating shaft but insulated from each other and the motor.

It will be noted particularly that the effective resistance of the indicator circuit a, b, c remains constant for each particular setting of the switch 56, variations in the effective resistance of the photo-electric cell circuit being compensated for by resistors $r_8$ and $r_9$.

The compensation for the photo cell fatigue characteristic by manual or automatic control of resistor $r_8$ is believed to be novel and to be usable in connection with many other applications of such photo-electric cells.

Figure 11 diagrammatically illustrates a colorimeter energized from an alternating current source of constant voltage. In this circuit, the parts of the instrument that are the same as the instrument shown in Fig. 10 have the same reference characters applied thereto. The excitor lamp 35 is energized from the secondary 70 of a suitable transformer 71. The direct current potential for opposing the potential output of the photo-electric cell in the indicating circuit is obtained from a suitable rectifier and filter 72 that is also energized from a secondary 73 of the transformer 71. Only one resistor $r_3$ is shown in this circuit to illustrate a form of instrument for measuring one character of unknown, although any number of such resistors could be used in this instrument. The primary winding 74 of the transformer is energized from any suitable source of alternating current of constant voltage. The functional operation and method of use of the instrument shown in Fig. 11 is the same as described in connection with Fig. 10.

Colorimeters of the character described have many advantages over colorimeters heretofore proposed for this purpose because of the simplicity of operating the instrument as compared with the precision of the indications given by the instrument.

One of the outstanding advantages of the instrument is that the entire reading scale of the instrument is effective in determining the characteristics of the unknown, so that a full scale deflection is obtained for the maximum concentration of each of the unknowns.

By means of the voltmeter V it is possible to have a predetermined standard spectral output from your excitor lamp light source, thereby greatly preserving the initial calibration.

Furthermore, the accuracy of the readings of the instrument are greatly increased by the use of a fixed opposing potential and a light source of fixed intensity, both of which are controlled from the resistor $r_7$, so that variations in the potential from the photo-electric cell and variations in the relative spectral output and intensity of the light source are avoided.

Calibration of the instrument is also made more permanent by the particular method for compensating for the fatigue characteristics of the photoelectric cell used in the combination with the control of the intensity and spectral range of the excitor lamp and the fixed opposing potential of the resistor $r_1$.

By the use of different resistors $r_3$ corresponding to the different unknowns being measured, the operator is enabled to obtain full scale deflection for maximum color concentration of any particular unknown that is intended to be measured by the instrument and also provides critical damping means for the galvanometer, so that the readings may readily and quickly be taken on scales calibrated for any desired unknown.

The interlocking of the particular dry color standards with the drum that carries the reading scales for the different unknowns prevents the improper use of a dry color standard with a scale that is not calibrated in accordance with that standard, thereby preventing mistakes on the part of the operator in his calibration of the instrument, and it also prevents the possible damage to the galvanometer movement if it were overloaded electrically by the use of too dense a filter in the light path.

The use of a series of scales that read directly in the desired units of the unknown greatly facilitates the determination of the unknown and avoids mistakes in making readings that might arise if a single arbitrary scale were used for determination of all of the unknowns, and it further enables the manufacturer to calibrate each scale of the instrument for a maximum scale deflection, assuring greater certainty and precision in reading the different unknowns being measured and when the indicator shows a normal condition of the patient, as indicated by the unknown specimen, the physician can immediately proceed with further tests.

Furthermore, in the use of the instrument in pathology, the normal patient's range of the particular substance being measured is preferably indicated on the scale by different coloration over the normal condition range for each unknown in order that the operator may determine at a glance whether or not a normal condition exists in the patient as to that particular test, and may proceed immediately to other tests.

A particular advantage of the colorimeter described is that interfering colors, such as those that may be due to administered drugs, may be subtracted from the regular colorimetric reaction in many cases if the foreign color can be obtained without adding the specific colorimetric reagent. This is accomplished by taking two readings of the unknown specimen, one without the colorimetric reagent added and the other with this reagent added, the difference between the two readings being the value of the unknown required. In some cases, if the foreign color is rather faint, the specimen without the reagent may be placed in the container which ordinarily contains the pure water, to give the zero adjustment, and then by adjusting resistance $r_8$ until the galvanometer again indicates zero, the unknown may be read directly according to the above described procedure. When the resistance $r_8$ adjustment has sufficient range to permit this adjustment to a false zero the specimen with the reagent added may be measured in the container 39 with one reading directly as if no foreign color were present.

One of the outstanding operating advantages of the colorimeter of the present invention is that it is not necessary to make up a standard solution for comparison purposes in each test thus obviating errors that might occur in the making of the standard solution. Also, the saving of time for making the standard solution is important.

Another advantage is that, since the device is calibrated initially against actual measured amounts of the unknowns to be measured or analyzed, confusing chemical characteristics due to variation in relative spectral attenuation between the unknown and standard solutions will not be encountered and introduce errors in the calibration.

The precision of the readings on any of the scales very demonstrably surpasses the precision obtained in these tests with the present colorimeters in common use.

Although a single embodiment of the invention has been herein shown and described, it will be understood that numerous details of the construction shown may be altered or omitted without departing from the spirit of this invention as defined in the following claims.

What I claim is:

1. The combination with a photo-electric cell of the class energized by light rays without external electrical energization and having output terminal members, of means for compensating for the fatigue characteristics of the cell in a circuit receiving energy therefrom comprising, a variable resistor connected in shunt relation with the photo-electric cell and in series relation with the circuit receiving energy from said cell, a constant speed, motor-operated resistor adjusting means for changing the shunt resistance value of said resistor portion connected in shunt relation with said cell in accordance with the fatigue characteristics of said cell to maintain a predetermined circuit voltage output from said cell for a predetermined light intensity and spectral range of illumination of said cell.

2. The combination with a photo-electric cell of the class energized by light rays without external electrical energization and having output terminal members, of means for compensating for the fatigue characteristics of the cell in a circuit receiving energy therefrom comprising, a variable resistor connected in shunt relation with the photo-electric cell and in series relation with the circuit receiving energy from said cell, a motor driven resistor adjusting means for changing the shunt resistance value of the portion of said resistor connected in shunt relation with said cell in accordance with the fatigue characteristics of said cell to maintain a predetermined circuit voltage output of said cell for a predetermined light intensity and spectral range of illumination of said cell, and slip control means permitting manual adjustment of said shunt resistance value to any position on the fatigue characteristic of said cell during operation of the motor driven resistor adjusting means.

3. The combination with a photo-electric cell of the class energized by light rays without external electrical energization and having output terminal members, means for compensating for the fatigue characteristics of the cell in a circuit receiving energy therefrom comprising, a resistor connected in series with the circuit receiving energy from said cell and having a portion of variable resistance value connected in shunt relation with the photo-electric cell, a constant speed, motor driven resistor adjusting means for changing the resistance value of the portion of said resistor connected in shunt relation with said cell in accordance with the fatigue characteristics of said cell to maintain a predetermined illumination of said cell, slip control means permitting manual adjustment of said shunt resistance value to any position on the fatigue characteristic, and a variable resistor connected in series with the circuit receiving energy from said cell and controlled by said constant speed motor driven resistor adjusting means and said slip control means for maintaining the total effective resistance of said circuit receiving energy from said cell at a predetermined value for different adjustments of said motor driven resistor adjusting means.

4. The combination in the indicating circuit of an electrical colorimeter, of a photo-electric cell for supplying energy to said indicating circuit, a source of direct current of predetermined fixed voltage connected in series in said circuit in opposed voltage relation with respect to said photo-electric cell and of substantially the maximum voltage output value of said cell for maximum illumination of said cell, a light source of predetermined constant intensity and spectral range for energizing said photo-electric cell, an electrical indicating instrument connected in series relation with the indicating circuit of said colorimeter for measuring the differential value of the voltage output from said source of direct current and said photo-electric cell, means in said indicating circuit for compensating for fatigue characteristics of said photo-electric cell, means for interposing the unknown to be measured between the photo-electric cell and said source of illumination to obscure the light delivered to said cell, and means for adjusting the potential applied to said electrical indicating instrument to give full scale deflection for the differential in the potential of said direct current source of energy and the output energy of said photo-electric cell for maximum light attenuating properties of a standard for the particular character of unknown being measured.

5. The combination in the indicating circuit of an electrical colorimeter, of a photo-electric cell for supplying energy to said indicating circuit, a source of direct current of predetermined fixed voltage connected in series in said circuit in opposed voltage relation with respect to said photo-electric cell and of substantially the maximum voltage output value of said cell for maximum illumination of said cell, a light source of predetermined constant intensity and spectral range for energizing said photo-electric cell, an electrical indicating instrument connected in series relation with said indicating circuit for measuring the differential value of the voltage output from said source of direct current and said photo-electric cell, means in said indicating circuit for compensating for fatigue characteristics of said photo-electric cell, and fixed resistance means connected in shunt relation with said electrical indicating instrument to provide full scale deflection of said instrument for the maximum light-attenuating properties of a standard for the particular character of unknown being measured.

6. The combination in the indicating circuit of an electrical colorimeter, of a photo-electric cell for supplying energy to said indicating circuit, a source of direct current of predetermined fixed voltage connected in series in said circuit in opposed voltage relation with respect to said photo-electric cell and of substantially the maximum voltage output value of said cell for maximum illumination of said cell, a light source of predetermined constant intensity and spectral range for energizing said photo-electric cell, an electrical indicating instrument connected in series relation with said indicating circuit for measuring the differential value of the voltage output from said source of direct current and said photo-electric cell, means in said indicating circuit for compensating for fatigue characteristics of said photo-electric cell, means for interposing the unknown to be measured between the photo-electric cell and said source of illumination to obscure the light delivered to said cell, means for adjusting the potential applied to said electrical indicating instrument to give full scale deflection for the differential in the potential of said direct current source of energy and the output energy of said photo-electric cell for maximum light attenuating properties of a standard for the particular character of unknown being measured, and means for maintaining the electrical resistance of said indicating circuit substantially constant for different compensation conditions of said photo-electric cell.

7. An electric colorimeter comprising an indicating circuit of constant resistance including a galvanometer, a source of direct current of constant potential in said indicating circuit, a photo-electric cell connected in said indicating circuit in opposed relation with respect to said source of constant potential, and a photo-electric cell exciter lamp of predetermined light intensity and spectral range energized from a source of constant potential, a movably mounted scale member having a plurality of calibrated scales thereon, each corresponding to an unknown to be determined, said scale member being movable to position a calibrated scale corresponding to the unknown to be tested for indicating deflections of said galvanometer, a shunt resistor corresponding to each of said scales for controlling the magnitude of deflection of said galvanometer during the test being run, and means for individually placing each of said resistors in shunt with said galvanometer for cooperation with its corresponding scale.

8. An electric colorimeter comprising an indicating circuit of constant resistance including a galvanometer, a source of direct current of constant potential in said indicating circuit, a photo-electric cell connected in said indicating circuit in opposed relation with respect to said source of constant potential, and a photo-electric cell exciter lamp of predetermined light intensity and spectral range energized from a source of constant potential, a movably mounted scale member having a plurality of calibrated scales thereon, each corresponding to an unknown to be determined, said scale member being movable to position a calibrated scale corresponding to the unknown to be tested for indicating deflections of said galvanometer, a shunt resistor corresponding to each of said scales for controlling the magnitude of deflection of said galvanometer during the test being run, and means controlled by the scale member for placing the corresponding resistor in shunt with said galvanometer upon the positioning of a particular scale to cooperate with said galvanometer.

9. An electric colorimeter comprising an indicating circuit of constant resistance including a galvanometer, a source of direct current of constant potential in said indicating circuit, a photo-electric cell connected in said indicating circuit in opposed relation with respect to said source of constant potential, and a photo-electric cell exciter lamp of predetermined light intensity and spectral range energized from a source of constant potential, a scale member having a plurality of calibrated scales thereon, each corresponding to an unknown to be determined, said scale member being movable to position a calibrated scale corresponding to the unknown to be tested for indicating deflections of said galvanometer, a shunt resistor corresponding to each of said scales for controlling the magnitude of deflection of said galvanometer during the test being run, a series of dry color filters, means for moving each of said filters into the path of the rays of said exciter lamp, and interlocking means associated with said filter moving means and said movable scale member for permitting movement of each of said filters only when certain of said scales are in test indicating position.

MILTON L. KUDER.